(12) United States Patent
Henneberry

(10) Patent No.: US 10,512,215 B1
(45) Date of Patent: Dec. 24, 2019

(54) TRENCHING AND EDGING ATTACHMENT FOR A RIDING LAWN MOWER OR COMPACT UTILITY TRACTOR

(71) Applicant: Daniel S. Henneberry, Hartford, WI (US)

(72) Inventor: Daniel S. Henneberry, Hartford, WI (US)

( * ) Notice: Subject to any disclaimer, the term of this patent is extended or adjusted under 35 U.S.C. 154(b) by 172 days.

(21) Appl. No.: 15/864,016

(22) Filed: Jan. 8, 2018

(51) Int. Cl.
| | |
|---|---|
| A01D 34/84 | (2006.01) |
| A01D 34/43 | (2006.01) |
| A01D 34/54 | (2006.01) |
| A01D 43/16 | (2006.01) |
| A01D 43/12 | (2006.01) |
| A01D 69/06 | (2006.01) |
| A01D 34/64 | (2006.01) |
| A01D 101/00 | (2006.01) |

(52) U.S. Cl.
CPC .............. *A01D 34/84* (2013.01); *A01D 34/43* (2013.01); *A01D 34/54* (2013.01); *A01D 43/12* (2013.01); *A01D 43/16* (2013.01); *A01D 69/06* (2013.01); *A01D 34/64* (2013.01); *A01D 2101/00* (2013.01)

(58) Field of Classification Search
CPC ..... A01B 33/028; A01B 33/02; A01B 33/082; A01B 33/08; E02F 5/101; E02F 5/08; E02F 3/10; E02F 3/188; A01D 43/16; A01D 34/84; A01D 69/06; A01D 43/12; A01D 34/54; A01D 34/43; A01D 34/64
See application file for complete search history.

(56) References Cited

U.S. PATENT DOCUMENTS

| | | | | | |
|---|---|---|---|---|---|
| 2,997,276 | A | * | 8/1961 | Davis ........................ | E02F 3/10 254/328 |
| 3,057,411 | A | * | 10/1962 | Carlton .................. | A01D 43/16 172/120 |
| 3,648,631 | A | * | 3/1972 | Fiedler ..................... | A01C 1/06 111/120 |
| 3,872,930 | A | * | 3/1975 | Campbell .............. | A01D 34/84 172/15 |
| 4,002,205 | A | * | 1/1977 | Falk ..................... | A01B 33/028 172/15 |
| 4,250,969 | A | * | 2/1981 | Orlanda ................. | A01B 39/10 172/110 |
| 4,277,935 | A | * | 7/1981 | Degen .................... | A01G 3/062 56/16.9 |

(Continued)

*Primary Examiner* — Arpad Fabian-Kovacs
(74) *Attorney, Agent, or Firm* — Donald J. Ersler

(57) ABSTRACT

A trenching and edging attachment for a riding lawn mower or compact utility tractor preferably includes a base frame, a cutter drive, a pair of pivoting height wheels and a cutter cover. The base frame preferably includes a lengthwise support member, a cutter support member, two support wheel extensions, a drive support extension, a pivot extension member and two attachment yokes. The pivot extension extends outward from the lengthwise support member and includes at least one retention hook. Each pivoting height wheel includes a wheel roller, a wheel yoke, and a height adjustment device. The wheel yoke is pivotally retained in the support wheel extension. The cutter drive preferably includes a cutter driven shaft, a right angle gearbox, a chain drive and a cutter drive shaft. A drive hub is attached to substantially an end of the cutter driven shaft to retain a trenching blade or an edger.

18 Claims, 5 Drawing Sheets

(56) References Cited

U.S. PATENT DOCUMENTS

| | | | | |
|---|---|---|---|---|
| 4,478,028 A | * | 10/1984 | Dawson, Jr. | A01G 3/062 56/16.9 |
| 4,528,805 A | * | 7/1985 | Zitta | A01D 34/001 56/11.6 |
| 4,551,967 A | * | 11/1985 | Murcko | A01D 43/16 56/11.3 |
| 5,029,435 A | * | 7/1991 | Buchanan | A01D 34/416 172/17 |
| 5,029,652 A | * | 7/1991 | Whitfield | A01B 45/02 172/1 |
| 5,040,360 A | * | 8/1991 | Meehleder | A01D 34/27 56/11.6 |
| 5,156,218 A | * | 10/1992 | Metzler | A01B 45/00 172/120 |
| 5,167,108 A | * | 12/1992 | Bird | A01D 43/16 56/10.4 |
| 5,179,823 A | * | 1/1993 | Pace | A01D 43/16 56/16.9 |
| 5,209,306 A | * | 5/1993 | Whitfield | A01B 45/02 172/118 |
| 5,226,248 A | * | 7/1993 | Pollard | A01B 45/00 144/334 |
| 5,263,303 A | * | 11/1993 | Stroud | A01D 34/416 56/12.7 |
| 5,560,189 A | * | 10/1996 | Devillier | A01D 43/16 172/14 |
| 6,003,611 A | * | 12/1999 | Martinez | A01D 34/84 172/15 |
| 6,041,584 A | * | 3/2000 | Hohnl | A01D 34/74 280/43 |
| 6,085,507 A | * | 7/2000 | Keane | A01D 43/16 172/14 |
| 6,276,119 B1 | * | 8/2001 | Oshima | A01D 34/74 56/15.9 |
| 6,339,918 B1 | * | 1/2002 | Thomas | A01D 34/74 56/17.2 |
| 6,779,325 B1 | | 8/2004 | Robillard, II | |
| 7,614,827 B1 | * | 11/2009 | Makk | A01G 25/06 405/182 |
| 7,644,779 B1 | * | 1/2010 | Templeton | A01B 33/028 15/79.2 |
| 8,464,504 B1 | | 6/2013 | Huff | |
| 8,516,783 B1 | * | 8/2013 | Maldonado | A01D 43/16 56/12.7 |
| 8,528,236 B2 | * | 9/2013 | Simpson | A01B 33/028 37/91 |
| 8,973,343 B2 | | 3/2015 | Bell | |
| 2003/0093983 A1 | * | 5/2003 | Savard | A01D 43/16 56/12.7 |
| 2003/0159418 A1 | * | 8/2003 | Lin | A01D 34/64 56/14.7 |
| 2004/0251037 A1 | * | 12/2004 | Templeton | A01B 33/028 172/42 |
| 2005/0193699 A1 | * | 9/2005 | Hatfield | A01D 34/416 56/12.7 |
| 2006/0021314 A1 | * | 2/2006 | Hatfield | A01D 34/001 56/12.7 |
| 2010/0083626 A1 | | 4/2010 | Foster | |
| 2012/0085557 A1 | * | 4/2012 | Jones | A01B 45/02 172/22 |
| 2013/0086880 A1 | * | 4/2013 | Williams | A01D 34/84 56/255 |
| 2015/0181803 A1 | * | 7/2015 | Tada | A01D 69/002 56/14.9 |
| 2017/0202138 A1 | * | 7/2017 | Pellenc | A01D 34/69 |

* cited by examiner

TRENCHING AND EDGING ATTACHMENT FOR A RIDING LAWN MOWER OR COMPACT UTILITY TRACTOR

BACKGROUND OF THE INVENTION

1. Field of the Invention

The present invention relates generally to lawn care and more specifically to a trenching and edging attachment for a riding lawn mower or compact utility tractor, which may be used for edging landscape beds and creating channels in lawns for the insertion of paver bricks.

2. Discussion of the Prior Art

U.S. Pat. No. 6,779,325 to Robillard, II discloses an edging and trimming assembly for lawn mower. Patent publication no. 20100083626 to Foster discloses an edging attachment for riding lawn mowers. U.S. Pat. No. 8,464,504 to Huff discloses an edger and trimmer for riding mower. U.S. Pat. No. 8,973,343 to Bell discloses a mower deck trimmer assembly. However, it appears that the prior art does not teach or suggest a trenching and edging attachment for a riding lawn mower or compact utility tractor, which may be in place of a grass cutter attachment for a riding lawn mower or compact utility tractor.

Accordingly, there is a clearly felt need in the art for a trenching and edging attachment for a riding lawn mower or compact utility tractor, which may be used for edging landscape beds and creating channels in lawns for the insertion of paver bricks.

SUMMARY OF THE INVENTION

The present invention provides a trenching and edging attachment for a riding lawn mower or compact utility tractor, which may be used for edging landscape beds and creating channels in lawns for the insertion of paver bricks. The trenching and edging attachment for a riding lawn mower or compact utility tractor (lawn care attachment) preferably includes a base frame, a cutter drive, a pair of pivoting height wheels and a cutter cover. The base frame preferably includes a lengthwise support member, a cutter support member, two support wheel extensions, a drive support extension, a pivot extension member and two attachment yokes. The cutter support member and a first support wheel extension extend from one end of the lengthwise support member and a second support wheel extension extends from an opposing end of the lengthwise support member. The cutter cover includes a curved plate, which is pivotally retained on the cutter support member. The drive support extension extends outward from the lengthwise support member. The pivot extension extends outward from the lengthwise support member and is terminated with at least one retention hook.

The at least one retention hook is sized to receive a retention bar of a lawn care machine, such as a riding lawn mower or compact utility tractor. The two attachment yokes extend upward from the lengthwise support member and are spaced apart to be received by two retention lugs extending downward from a bottom of a lawn care machine. A retention bolt is used to secure the retention lug in the attachment yoke to secure the lawn care attachment to the lawn care machine.

Each pivoting height wheel includes a wheel roller, a wheel yoke, and a height adjustment device. The wheel yoke is pivotally retained in one of the two support wheel extensions. The wheel roller is rotatably retained in an end of the wheel yoke. The height adjustment device is mounted to one of the two support wheel extensions and controls the height of the wheel roller through rotation of an adjustment screw. The cutter drive preferably includes a cutter driven shaft, a right angle gearbox, a chain drive and a cutter drive shaft. A drive hub is attached to substantially an end of the cutter driven shaft. The cutter driven shaft is preferably rotatably retained by two driven bearing blocks. The two driven bearing blocks are attached to the cutter support member. The cutter driven shaft is preferably connected to an output of the right angle gearbox with a torque limiting clutch. A driven sprocket is attached to an input shaft of the right angle gearbox. A cutter drive shaft is rotatably retained by two drive bearing blocks. The two drive bearing blocks are attached to the base frame. A drive sprocket is retained on one end of the cutter drive shaft and a drive linkage is retained on an opposing end of the drive shaft. A chain is attached to the drive sprocket and to the driven sprocket. An idler sprocket may be used to take-up any slack in the chain and to redirect a path of a non-tensioned side of the chain.

In use, the at least one retention hook is secured to the retention bar of the lawn care machine. The two attachment yokes are secured to the two retention legs with two retention pins. The drive linkage is connected to a drive port of the lawn care machine. An edger blade or a trenching blade is attached to the drive hub.

Accordingly, it is an object of the present invention to provide a lawn care attachment, which is used in place of a grass cutter attachment for a riding lawn mower or compact utility tractor.

Finally, it is another object of the present invention to provide a lawn care attachment, which may be used for edging landscape beds and creating channels in lawns for the insertion of paver bricks.

These and additional objects, advantages, features and benefits of the present invention will become apparent from the following specification.

DETAILED DESCRIPTION OF THE PREFERRED EMBODIMENTS

Figure 1:
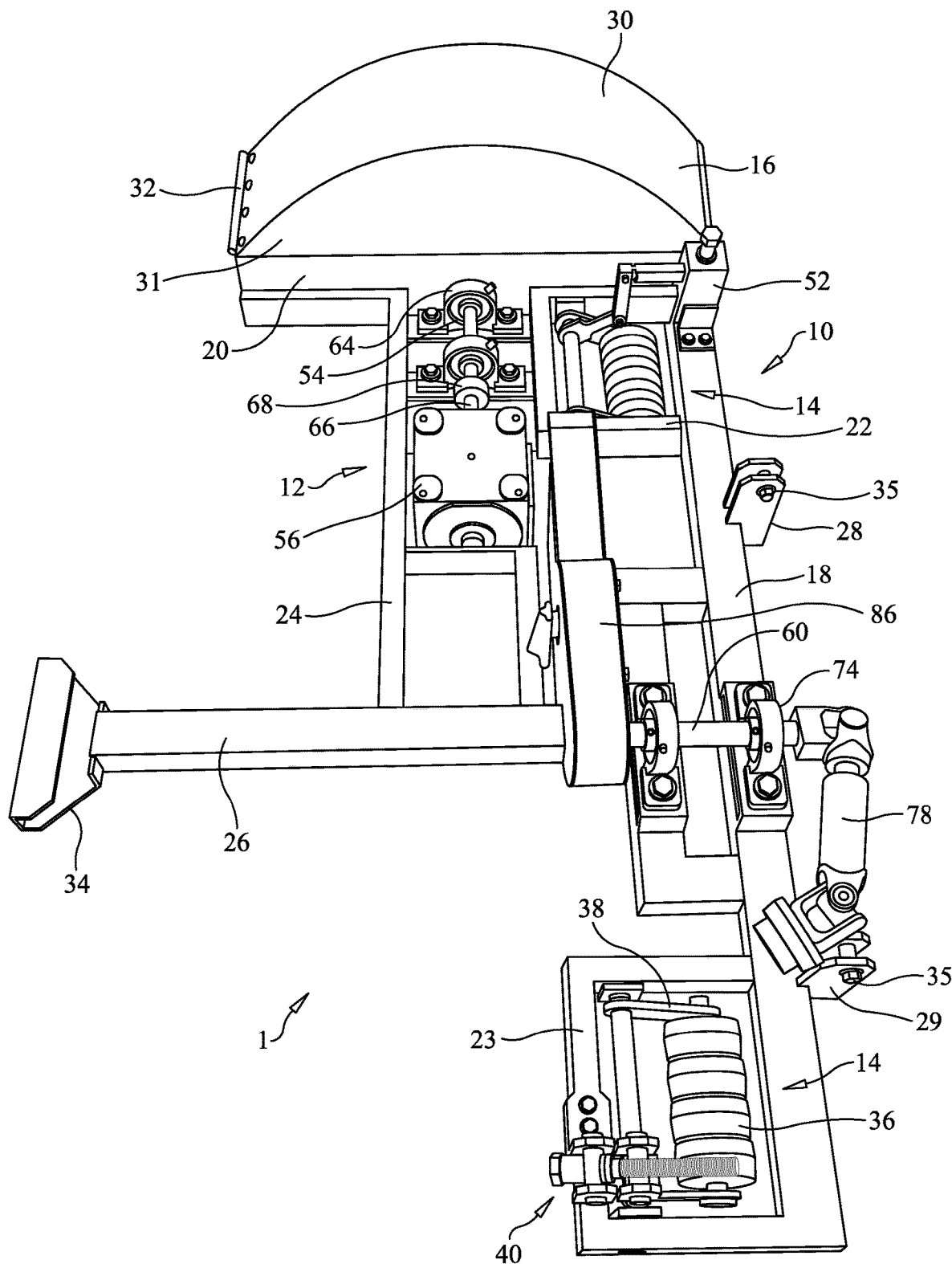
FIG. 1 is a perspective view of a lawn care attachment in accordance with the present invention.
Figure 2:
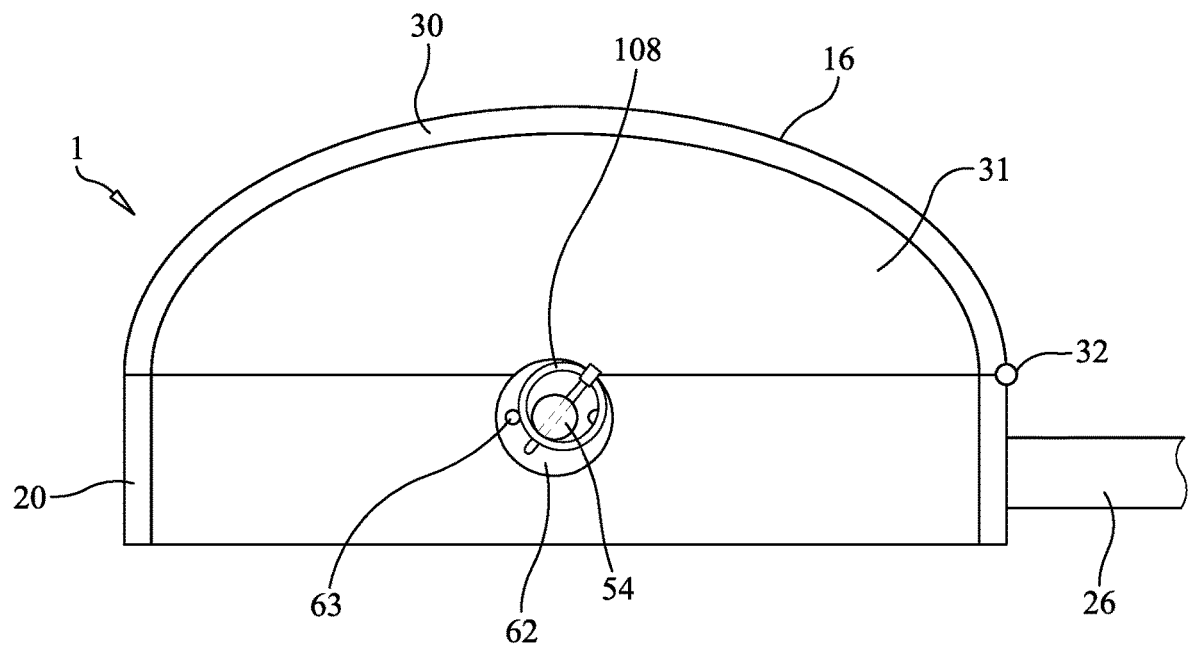
FIG. 2 is an end view of a lawn care attachment in accordance with the present invention.
Figure 3:
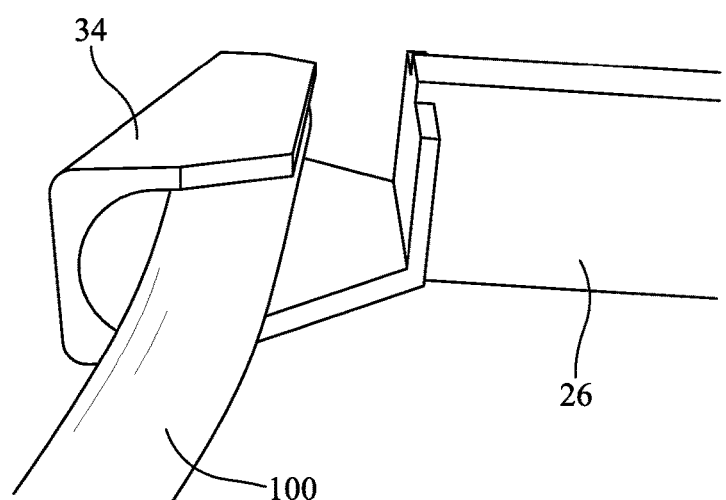
FIG. 3 is an enlarged perspective end view of at least one retention hook of a pivot extension of a lawn care attachment engaged with a retention bar of a lawn machine in accordance with the present invention.

With reference now to the drawings, and particularly to FIG. 1, there is shown a perspective view of a lawn care attachment 1. With reference to FIG. 2, the lawn care attachment 1 preferably includes a base frame 10, a cutter drive 12, a pair of height adjustable wheels 14 and a cutter cover 16. The base frame 10 preferably includes a lengthwise support member 18, a cutter support member 20, two support wheel extensions 22, 23, a drive support extension 24, a pivot extension member 26 and two attachment yokes 28, 29. The cutter support member 20 and the first support wheel extension 22 are secured to one end of the lengthwise support member 18 and the second support wheel extension 23 extends from an opposing end of the lengthwise support member 18. The cutter cover 16 includes a curved top plate 30 and an end plate 31. An end of the curved top plate 30 is pivotally retained on the cutter support member 20 with a hinge 32. The drive support extension 24 extends outward from the lengthwise support member 18. With reference to FIG. 3, the pivot extension member 26 extends outward from the lengthwise support member 18 and is terminated with at least one retention hook 34. The at least one retention hook 34 is sized to receive a retention bar 100 of a lawn care machine (not shown), such as a riding lawn mower or compact utility tractor. The two attachment yokes 28, 29 extend upward from the lengthwise support member 18 and are spaced apart to be received by two retention lugs extending downward from a bottom a lawn care machine (not shown). A retention bolt 35 is secured to each yoke 28, 29 and retention lug to retain the law care attachment 1 on the lawn care machine.

Figure 4:
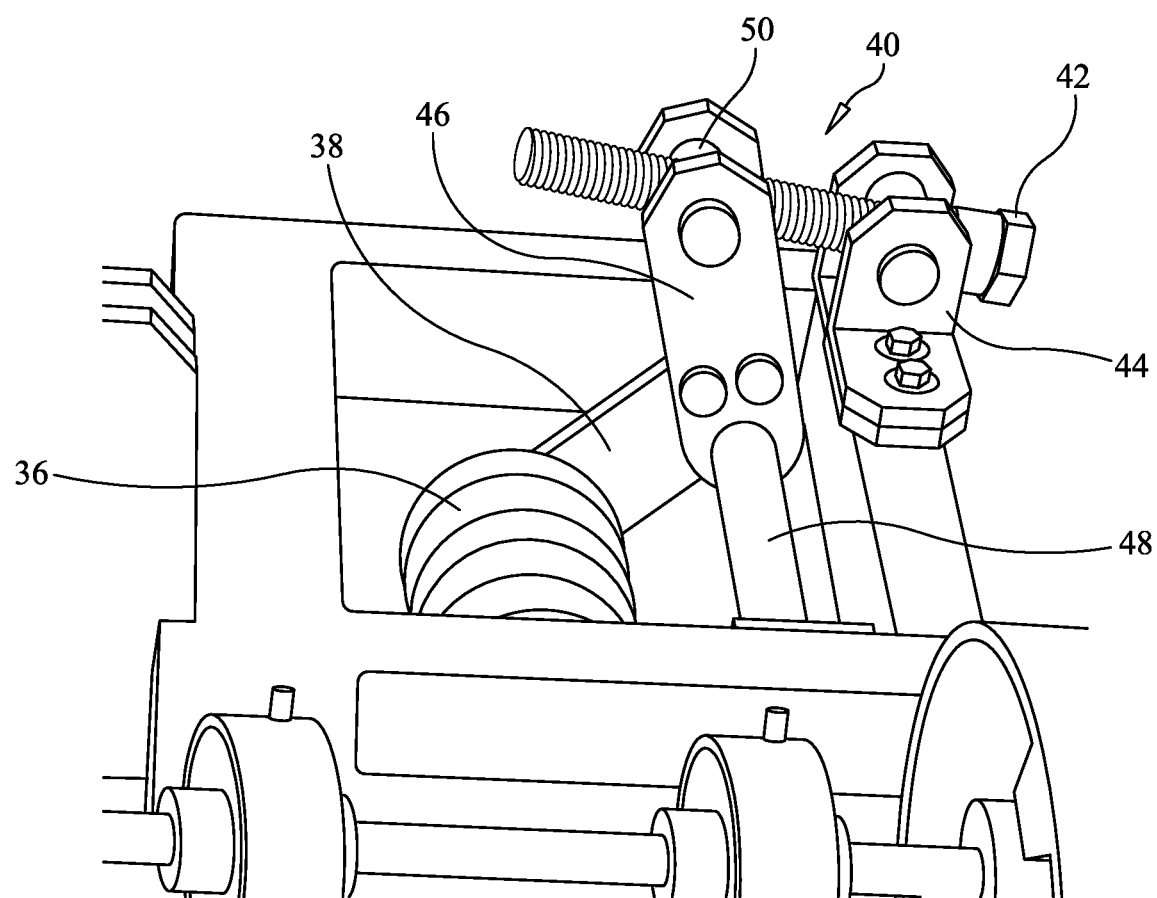
FIG. 4 is a perspective end view of a pivoting height wheel of a lawn care attachment in accordance with the present invention.

With reference to FIG. 4, each height adjustable wheel 14 includes a wheel roller 36, a wheel yoke 38, and a height adjustment device 40. The wheel yoke 38 is pivotally retained in the support wheel extension 23. The wheel roller 36 is rotatably retained in an end of the wheel yoke 38. The height adjustment device 40 is mounted to the support wheel extension 23 and controls a height of the wheel roller 36 through rotation of an adjustment screw 42. The height adjustment device 40 preferably includes the adjustment screw 42, a first yoke 44 and a second yoke 46. The first yoke 44 is secured to the support wheel extension 23. The adjustment screw 42 is rotatably retained in the first yoke 44. The second yoke 46 is attached to a pivot member 48 of the wheel yoke 38. A pivoting nut 50 is pivotally retained in the second yoke 46. The pivoting nut 50 is sized to threadably receive the adjustment screw 42. However, other designs of height adjusting mechanisms may also be used, such as a height adjusting device 52 mounted on the support wheel extension 22.

Figure 5:
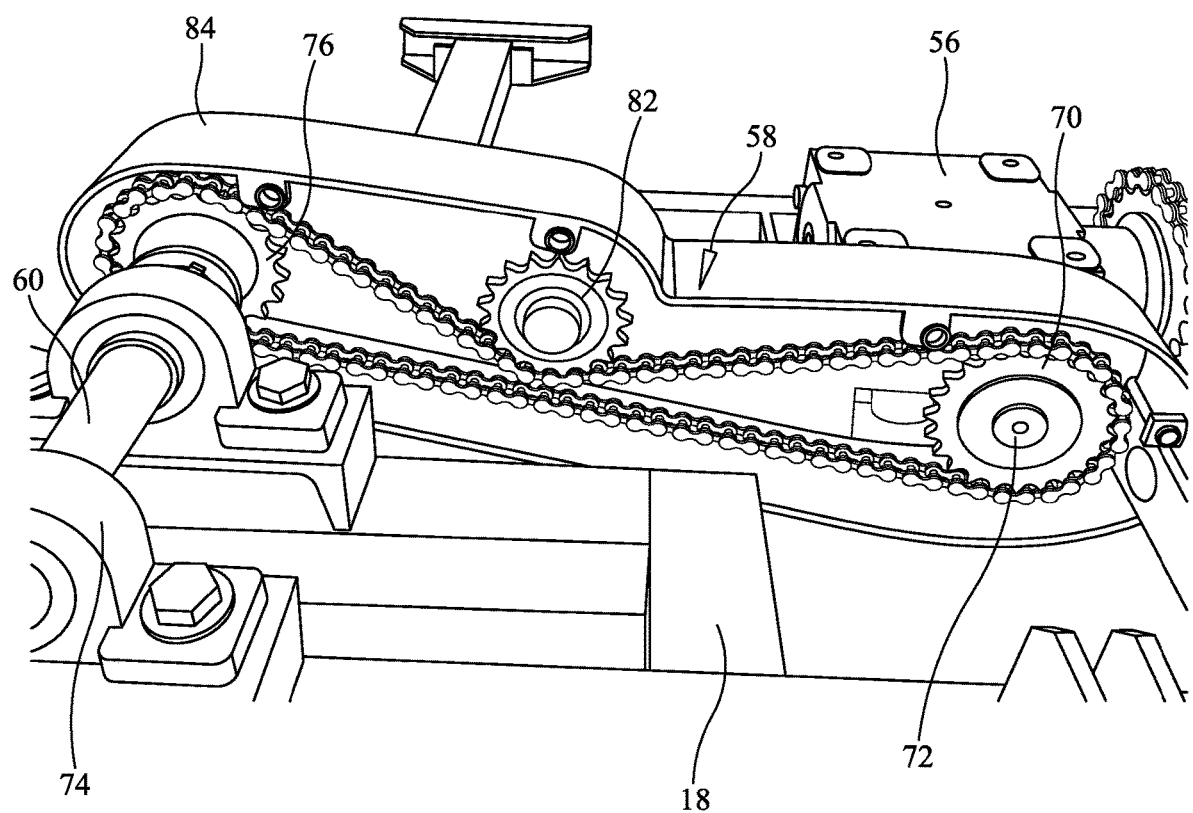
FIG. 5 is a rear perspective view of a chain drive of a lawn care attachment in accordance with the present invention.
Figure 6:
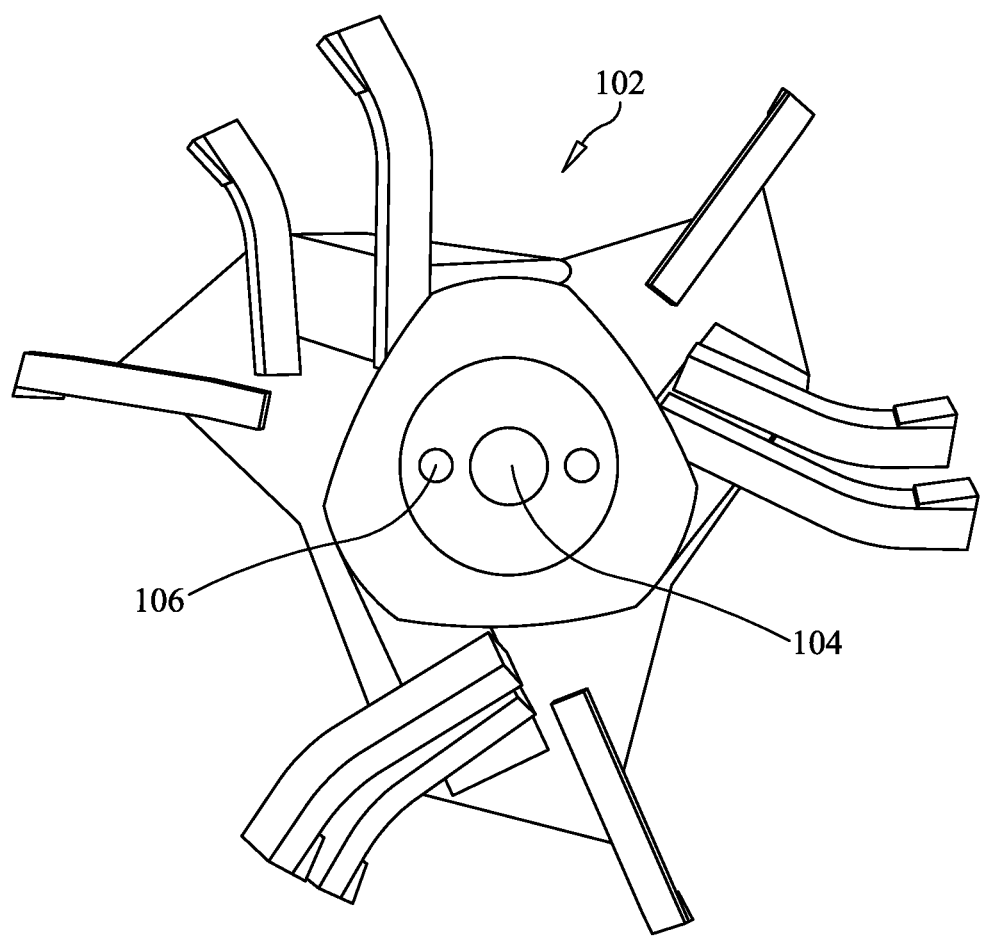
FIG. 6 is an end view of a cutter tool for attachment to a drive hub of a lawn care attachment in accordance with the present invention.

With reference to FIG. 5, the cutter drive 12 preferably includes a cutter driven shaft 54, a right angle gearbox 56, a chain drive 58 and a cutter drive shaft 60. With reference to FIG. 2, a drive hub 62 is attached to substantially an end of the cutter driven shaft 54. The drive hub 62 includes two drive pins 63. FIG. 6 shows a cutter head 102 for attachment to the hub 62. The cutter head 102 includes shaft hole 104 and two drive pin holes 106. The cutter head 102 is retained on the hub 62 with a snap pin 108. The cutter driven shaft 54 is preferably rotatably retained by two driven bearing blocks 64. The drive hub 62 is located under the cutter cover 16. The two driven bearing blocks 64 are attached to the cutter support member 24. The cutter driven shaft 54 is preferably connected to an output of an adjustable torque limiting clutch 68. An input of the adjustable torque limiting clutch 68 is preferably connected to an output shaft 66 of the right angle gearbox 56. A driven sprocket 70 is attached to an input shaft 72 of the right angle gearbox 56. The cutter drive shaft 60 is rotatably retained by two drive bearing blocks 74. The two drive bearing blocks 74 are attached to the base frame 18. A drive sprocket 76 is retained on one end of the cutter drive shaft 60 and a drive linkage 78 is retained on an opposing end of the drive shaft 60. A chain 80 is attached to the drive sprocket 76 and to the driven sprocket 70. An idler sprocket 82 may be used to take-up any slack in the chain 80. The chain drive 58 includes the driven sprocket 70, the drive sprocket 76, the chain 80, the idler sprocket 82 and a drive cover 84. A cover plate 86 may be used to cover an open end of the drive cover 84.

In use, the at least one retention hook 34 is secured to the retention bar 100 of the lawn care machine. The two attachment yokes 28, 29 are secured to the two retention lugs with the two retention bolts 35. The drive linkage 78 is connected to a drive port of the lawn care machine. A lawn care rotary attachment, such as an edger blade or the trenching blade 102 is attached to the drive hub 62.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A trenching and edging attachment for a lawn care machine, the lawn care machine includes a drive member and a bottom comprising:
   a base frame includes a first height adjustable wheel pivotally retained in a first horizontal axis on one end of said base frame and a second height adjustable wheel pivotally retained in a second horizontal axis on an opposing end of said base frame, said first and second height adjustment wheels provide height adjustment for said trenching and edging attachment, a first adjustment device retains a vertical height of said first height adjustment wheel, a second adjustment device retains a vertical height of said second height adjustment wheel;
   a cutter driven shaft includes a drive hub, a cutter attachment is selectively detachable relative to said drive hub, said cutter driven shaft is rotatably retained relative to said base frame, wherein said cutter driven shaft is coupled to the drive member of the lawn care machine; and
   at least one device for mounting said base frame to the bottom of the lawn care machine.

2. The trenching and edging attachment for a lawn care machine of claim 1, further comprising:
   a right angle gearbox includes an input shaft and an output shaft, said output shaft is connected to said cutter driven shaft through a torque limiting clutch, a driven sprocket is attached to said input shaft.

3. The trenching and edging attachment for a lawn care machine of claim 2, further comprising:
   a cutter drive shaft is rotatably retained relative to said base frame, said cutter drive shaft having one end connected to the drive member, a drive sprocket is attached to an opposing end of said drive shaft, a chain is retained on said drive sprocket and said driven sprocket.

4. The trenching and edging attachment for a lawn care machine of claim 3, further comprising:
   said cutter driven shaft is rotatably retained relative to said base frame with two driven bearing blocks; and
   said cutter drive shaft is rotatably retained relative to said base frame with two drive bearing blocks.

5. The trenching and edging attachment for a lawn care machine of claim 1 wherein:
   said first and second height adjustable wheels include a wheel roller, a wheel yoke, and said first and second height adjustment devices, said wheel roller is rotatably retained in an end of said wheel yoke, said wheel yoke is pivotally retained in said base frame, said first and second height adjustment devices include an adjustment screw for adjusting a height of said wheel yoke.

6. The trenching and edging attachment for a lawn care machine of claim 1 wherein:

a cutter cover includes a curved top plate and an end plate, an end of said curved top plate is pivotally retained on said base frame.

7. A trenching and edging attachment for a lawn care machine, the lawn care machine includes a drive member and a bottom comprising:

a base frame includes a first height adjustable wheel pivotally retained in a first horizontal axis on one end of said base frame and a second height adjustable wheel pivotally retained in a second horizontal axis on an opposing end of said base frame, said first and second height adjustment wheels provide height adjustment for said trenching and edging attachment, a first adjustment device retains a vertical height of said first height adjustment wheel, a second adjustment device retains a vertical height of said second height adjustment wheel;

a cutter driven shaft includes a drive hub, a cutter attachment is selectively detachable relative to said drive hub, said cutter driven shaft is rotatably retained relative to said base frame, said cutter driven shaft extends over said one end or said opposing end of said base frame, wherein said cutter driven shaft is coupled to the drive member of the lawn care machine; and at least one device for mounting said base frame to the bottom of the lawn care machine.

8. The trenching and edging attachment for a lawn care machine of claim 7, further comprising:

a right angle gearbox includes an input shaft and an output shaft, said output shaft is connected to said cutter driven shaft through a torque limiting clutch, a driven sprocket is attached to said input shaft.

9. The trenching and edging attachment for a lawn care machine of claim 8, further comprising:

a cutter drive shaft is rotatably retained relative to said base frame, said cutter drive shaft having one end connected to the drive member, a drive sprocket is attached to an opposing end of said drive shaft, a chain is retained on said drive sprocket and said driven sprocket.

10. The trenching and edging attachment for a lawn care machine of claim 9, further comprising:

said cutter driven shaft is rotatably retained relative to said base frame with two driven bearing blocks; and said cutter drive shaft is rotatably retained relative to said base frame with two drive bearing blocks.

11. The trenching and edging attachment for a lawn care machine of claim 7 wherein:

said first and second height adjustable wheels include a wheel roller, a wheel yoke, and said first and second height adjustment devices, said wheel roller is rotatably retained in an end of said wheel yoke, said wheel yoke is pivotally retained in said base frame, said first and second height adjustment devices include an adjustment screw for adjusting a height of said wheel yoke.

12. The trenching and edging attachment for a lawn care machine of claim 7 wherein:

a cutter cover includes a curved top plate and an end plate, an end of said curved top plate is pivotally retained on said base frame.

13. A trenching and edging attachment for a lawn care machine, the lawn care machine includes a drive member and a bottom comprising:

a base frame includes a first height adjustable wheel pivotally retained in a first horizontal axis on one end of said base frame and a second height adjustable wheel pivotally retained in a second horizontal axis on an opposing end of said base frame, said first and second height adjustment wheels provide height adjustment for said trenching and edging attachment, a first adjustment device retains a vertical height of said first height adjustment wheel, a second adjustment device retains a vertical height of said second height adjustment wheel;

a cutter driven shaft includes a drive hub, a cutter attachment is selectively detachable relative to said drive hub, said cutter driven shaft is rotatably retained relative to said base frame, wherein said cutter driven shaft is coupled to the drive member of the lawn care machine;

a pivot extension member extends outward from said base frame, wherein an end of said pivot extension member hooks on to the bottom of the lawn care machine; and a pair of retention yokes extend upward from said base frame, wherein said pair of retention yokes are attached to the bottom of the lawn care machine.

14. The trenching and edging attachment for a lawn care machine of claim 13, further comprising:

a right angle gearbox includes an input shaft and an output shaft, said output shaft is connected to said cutter driven shaft through a torque limiting clutch, a driven sprocket is attached to said input shaft.

15. The trenching and edging attachment for a lawn care machine of claim 14, further comprising:

a cutter drive shaft is rotatably retained relative to said base frame, said cutter drive shaft having one end connected to the drive member, a drive sprocket is attached to an opposing end of said drive shaft, a chain is retained on said drive sprocket and said driven sprocket.

16. The trenching and edging attachment for a lawn care machine of claim 15, further comprising:

said cutter driven shaft is rotatably retained relative to said base frame with two driven bearing blocks; and said cutter drive shaft is rotatably retained relative to said base frame with two drive bearing blocks.

17. The trenching and edging attachment for a lawn care machine of claim 13 wherein:

said first and second height adjustable wheels include a wheel roller, a wheel yoke, and said first and second height adjustment devices, said wheel roller is rotatably retained in an end of said wheel yoke, said wheel yoke is pivotally retained in said base frame, said first and second height adjustment devices include an adjustment screw for adjusting a height of said wheel yoke.

18. The trenching and edging attachment for a lawn care machine of claim 13 wherein:

a cutter cover includes a curved top plate and an end plate, an end of said curved top plate is pivotally retained on said base frame.

* * * * *